US006912968B2

(12) United States Patent

Carbajal

(10) Patent No.: US 6,912,968 B2

(45) Date of Patent: Jul. 5, 2005

(54) SCHEDULE INDICATOR

(75) Inventor: Francisco Javier Carbajal, Arlington, TN (US)

(73) Assignee: Hunter Fan Company, Memphis, TN (US)

( * ) Notice: Subject to any disclaimer, the term of this patent is extended or adjusted under 35 U.S.C. 154(b) by 0 days.

(21) Appl. No.: 10/379,826

(22) Filed: Mar. 4, 2003

(65) Prior Publication Data

US 2004/0173137 A1 Sep. 9, 2004

(51) Int. Cl.[7] ................................................ G01D 13/22

(52) U.S. Cl. ....................... 116/308; 116/300; 116/309; 116/315; 116/316; 96/417; 55/DIG. 34

(58) Field of Search ................................ 116/308, 306, 116/307, 309, 311, 312, 315, 316, 317, 318, 299, 290, 293, 300, DIG. 1; 96/417; 55/DIG. 34; 40/493, 495

(56) References Cited

U.S. PATENT DOCUMENTS

| | | | | | |
|---|---|---|---|---|---|
| 3,151,599 | A | * | 10/1964 | Livingston | 116/308 |
| 3,227,127 | A | * | 1/1966 | Gayle | 116/308 |
| 3,818,858 | A | * | 6/1974 | Kramer et al. | 116/308 |
| 4,528,933 | A | * | 7/1985 | Allen | 116/308 |
| 4,582,251 | A | * | 4/1986 | Odom et al. | 236/94 |
| 4,753,189 | A | * | 6/1988 | Mastman et al. | 116/308 |
| 4,886,010 | A | * | 12/1989 | Stutzman | 116/308 |
| 5,056,454 | A | * | 10/1991 | Turner | 116/209 |
| 5,184,739 | A | * | 2/1993 | Kusz | 215/220 |
| 5,303,612 | A | * | 4/1994 | Odom et al. | 74/553 |
| D350,191 | S | | 8/1994 | Tsuji | D23/364 |
| 5,345,838 | A | * | 9/1994 | Howie, Jr. | 74/553 |
| 5,433,324 | A | * | 7/1995 | Leonard | 206/534 |
| D370,711 | S | * | 6/1996 | Serenko et al. | D23/209 |
| 5,564,361 | A | * | 10/1996 | Satterwhite | 116/308 |
| D395,704 | S | | 6/1998 | Thomas et al. | D23/364 |
| 5,769,118 | A | * | 6/1998 | Lenberg | 137/553 |
| D396,097 | S | | 7/1998 | Thomas et al. | D23/364 |
| 5,811,004 | A | * | 9/1998 | Robertson et al. | 210/482 |
| D402,022 | S | | 12/1998 | Termeer et al. | D23/364 |
| D402,745 | S | | 12/1998 | Termeer et al. | D23/364 |
| 5,862,737 | A | * | 1/1999 | Chiu et al. | 96/416 |
| 5,893,939 | A | * | 4/1999 | Rakocy et al. | 55/471 |
| 5,967,350 | A | * | 10/1999 | Jones | 215/222 |
| 6,017,375 | A | * | 1/2000 | Duell et al. | 55/356 |
| 6,059,132 | A | * | 5/2000 | Benjamin | 215/206 |
| D451,182 | S | | 11/2001 | Tsuji | D23/364 |
| 6,315,821 | B1 | * | 11/2001 | Pillion et al. | 96/416 |
| 6,789,497 | B1 | * | 9/2004 | Aiken | 116/308 |

* cited by examiner

*Primary Examiner*—Christopher W. Fulton

*Assistant Examiner*—Amy R. Cohen

(74) *Attorney, Agent, or Firm*—Baker Donelson

(57) ABSTRACT

A schedule indicator (14) is provided having a wall with a first selection arrow (13) and a base (16). The base has an annular bottom wall (18) with an annular array of upwardly projecting protrusions (20). The schedule indicator also includes a first condition indicating ring (24) and a second condition indicating knob (25) positioned concentrically within the indicating ring. The indicating ring has a peripheral top surface (27) having an annular array of timing indicia (28), a recessed top surface (29) having an annular array of top depressions (31), and a bottom surface (32) with an annular array of bottom depressions (33). The indicating knob has a grasping portion (37) with a second selection arrow (38) thereon, and at least one protrusion (39) sized and shaped to be releasably received within the indicating ring top depressions (31).

10 Claims, 3 Drawing Sheets

SCHEDULE INDICATOR

TECHNICAL FIELD

This invention relates to schedule indicators, and specifically to manual schedule indicators of the type that show when two separate selected elements of a device should be replaced or maintained.

BACKGROUND OF THE INVENTION

Many devices in today's market include elements which must be replaced or maintained periodically in order to provide optimal efficiency. Some of these devices have two separate and distinct elements that may be replaced at different timed intervals or timed periods. Furthermore, even in cases wherein two elements should be replaced at the same time, in actual use, they oftentimes are replaced at different times due to the other factors such as the lack of replacement elements, personnel schedules or the like. In such event, the actual replacement sequence of these two elements may become different, and thus a dual indicator may be desired to indicate the actual replacement time or schedule of each element.

By way of example, air purifiers have grown in popularity in recent years. A growing concern for health and an increased recognition of the risks associated with unclean air are largely responsible for this trend. For example, airborne pollutants can cause or contribute to a number of respiratory problems, including respiratory infections, asthma, and allergies. Additionally, some airborne pollutants can cause undesirable odors. While air purifiers are available in a wide variety of designs, a conventional air purifier includes a blower that moves air through a filter element. A number of different filter elements with different filtering characteristics are commercially available. For example, particulate filters are available to remove particulate matter from air. A conventional particulate filter includes a substance, such as fiberglass or electret-type media, that traps particulate matter as air is passed therethrough. Another example, odor filters are available to remove odors from the air. A conventional odor filter includes activated carbon, or activated charcoal, which removes pollutants from the air primarily by absorption. Another form of a filter may include two filter elements of varying filtering capabilities. A pre-filter may be used remove large particulates from the air while a subsequent filter in the air flow removes finer or smaller particulates. As the pre-filter and fine particulate filter may have different useful lives it would be desirous for the air purifier to include an indicator to show the scheduled replacement date for each of the two filters. However, because of limited space available on the face of an air-purifier it may not be able to accommodate multiple indicators.

Accordingly, it is seen that a need remains for a schedule indicator that can indicate two separate timing intervals without occupying a large amount of space. It is to the provision of such therefore that the present invention is primarily directed.

SUMMARY OF THE INVENTION

In a preferred form of the invention a schedule indicator comprises a base having at least one protrusion, a rotatable first condition indicating ring having a bottom surface with an annular array of first depressions sized and shaped to engage the base protrusion, and a top surface with an annular array of second depressions, a rotatable second condition indicating member position concentrically within the first condition indicating ring, the second condition indicating member having at least one protrusion sized and shaped to engage the first condition indicating ring second depressions, and means for coupling the indicating ring and the indicating member to the base. With this construction, manual rotation of the indicating member causes the indicating member protrusion to disengage from the indicating ring second depression and ride upon the top surface of the indicating ring between adjacent second depressions so as to cause a downward force upon the indicating ring which ensures that the base protrusion is maintained within the indicating ring first depression to prevent rotation of the indicating ring relative to the base, and whereby manual rotation of the indicating ring causes the base protrusion to be disengaged from the indicating ring first depression and ride upon the bottom surface of the indicating ring between adjacent first depressions causing the indicating ring to move away from the base thereby forcing the indicating member protrusion into engagement with the indicating ring second depression which ensures that the indicating member rotates in conjunction with the rotation of the indicating ring.

DETAILED DESCRIPTION

With reference next to the drawings, there is shown an air purifier 10 in the form of a portable, self-standing unit. The air purifier 10 has a housing 11 having a top wall 12 with a schedule indicator 14 in a preferred form of the invention. The air purifier 10 has an unshown pre-filter and an unshown fine particulate filter, such as a HEPA filter within the housing, therein which should be replaced or maintained periodically according to the useful life of each filter.

Figure 1:
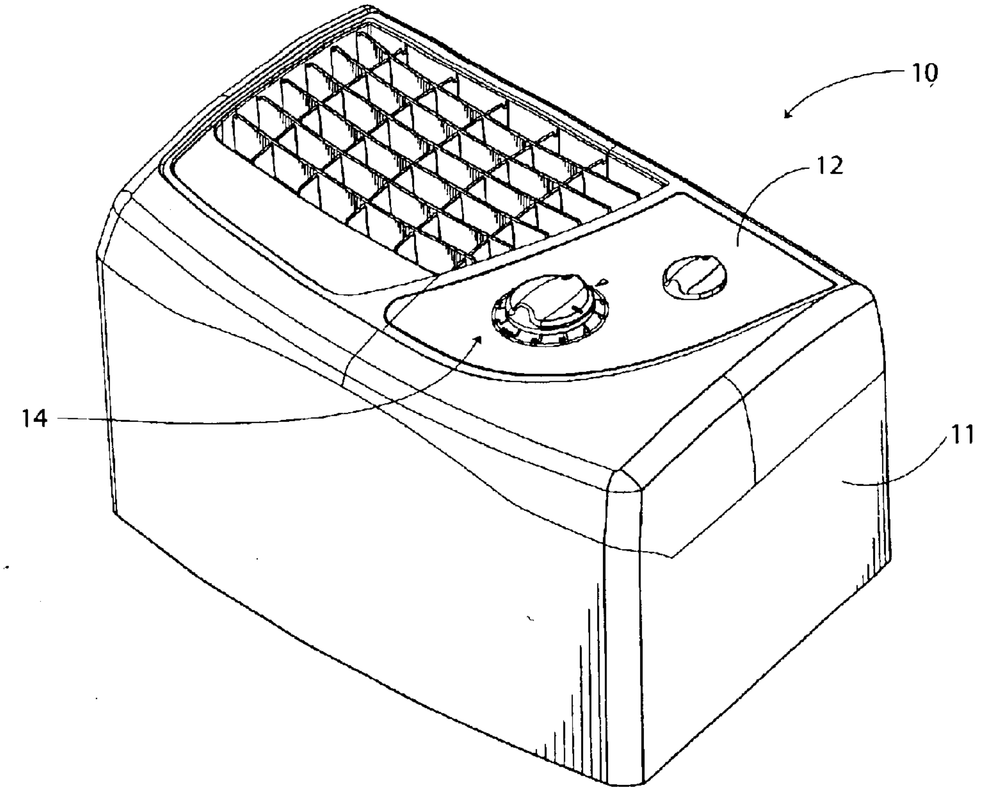
FIG. 1 is a perspective view of an air purifier having a schedule indicator embodying principles of the invention is a preferred form.
Figure 2:
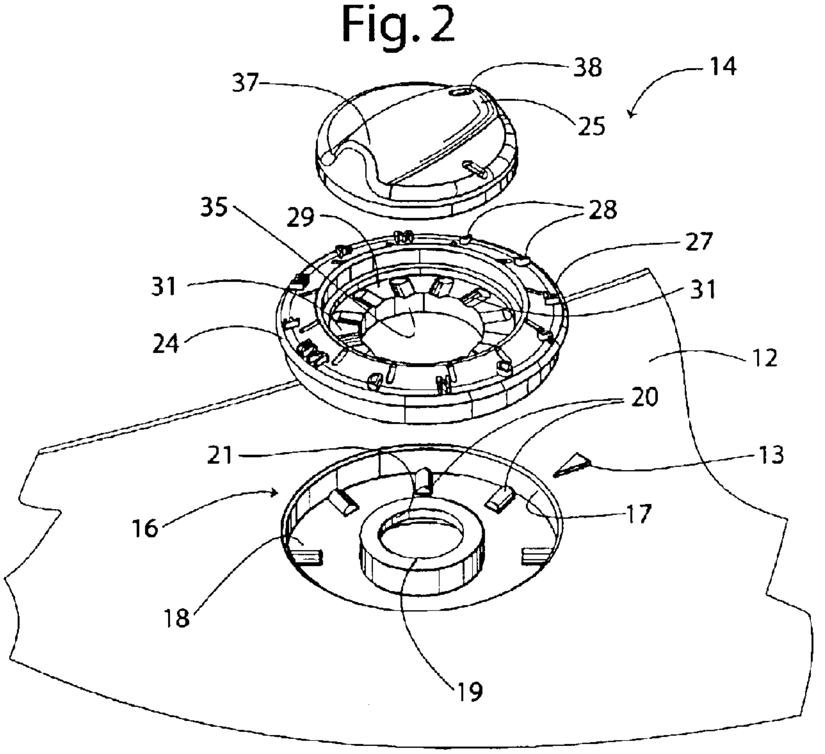
FIG. 2 is a perspective, exploded view of a portion of the air purifier of FIG. 1 showing the schedule indicator in more detail.

The housing top wall 12 has a first selection arrow 13 and an indicator well which forms the base 16 of the indicator 14, as best shown in FIG. 2. The base 16 has a cylindrical side wall 17 and an annular bottom wall 18. The bottom wall 18 has a centrally located mounting opening 19 extending therethrough and an annular array of upwardly projecting protrusions 20 positioned about the mounting opening 19. The mounting opening 19 has an inwardly extending interior lip 21.

The schedule indicator 14 also includes a first condition indicating ring 24 and a second condition indicating member or knob 25 positioned concentrically within the indicating ring 24. The indicating ring 24 has a peripheral top surface 27 having an annular array of timing indicia 28, a recessed top surface 29 having an annular array of top depressions 31, and a bottom surface 32 with an annular array of bottom depressions 33. The indicating ring 24 also has a centrally located mounting opening 35 therein.

The indicating knob 25 has a grasping portion 37 with a second selection arrow 38 thereon, at least one protrusion or cam 39 sized and shaped to be releasably received within the indicating ring top depressions 31, and a mounting post 41. The mounting post 41 has a plurality of somewhat flexible mounting tabs 42 each having a catch 43 configured to engage the base mounting opening lip 21. The mounting post 41 extends through the mounting opening 35 in the indicating ring 24 and through the mounting opening 19 in the base, wherein it is retained in position by the engagement of tab catches 43 with the opening lip 21.

Here, the schedule indicator is to be used in conjunction with the scheduled maintenance or replacement of the air purifier's pre-filter and fine particulate filter. The indicating ring 24 is to be associated with the maintenance of the fine particulate filter while the indicating knob 25 is to be associated with the maintenance of the pre-filter. However, it should be understood that the indicating ring 25 and indicating knob 25 may be associated with the scheduled maintenance of any type of item associated with any type of device and are not intended to be limited to the use of filters or even air purifiers in general.

Figure 3:
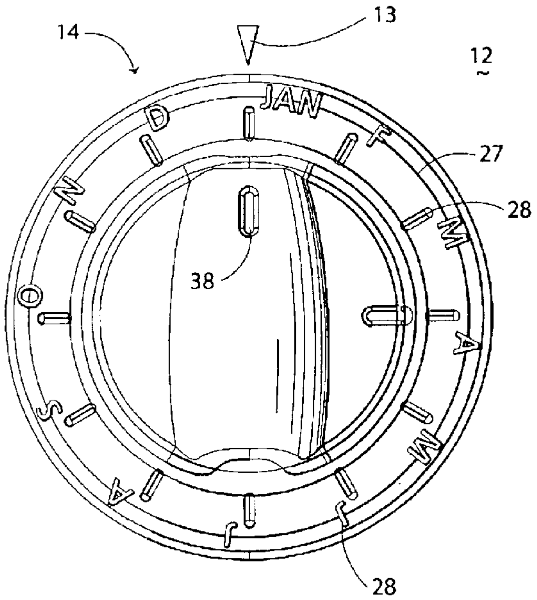
FIGS. 3–5 are a series of top views of the schedule indicator of FIG. 1 showing different positions of the knob portion and the ring portion.

Initially, the schedule indicator 14 may be set with any month indicated by the indicating ring timing indicia 28 aligned with the housing first selection arrow 13 and the indicating knob second selection arrow 38 aligned with any month indicated by the indicating ring timing indicia 28. In the exampled described herein and with reference to FIG. 3, the indicating ring timing indicia 28 is aligned so that the month of January (JAN) is aligned with the first selection arrow 13, thus indicating that the operator is replacing the filters in the month of January. The indicating knob is positioned with the second selection arrow 38 aligned with the month of January (JAN) of the indicating ring timing indicia 28. It should be noted that it is not necessary to align the indicating ring and indicating knob to indicate the current or present calendar month, and that this was done herein for ease of explanation.

Figure 6:
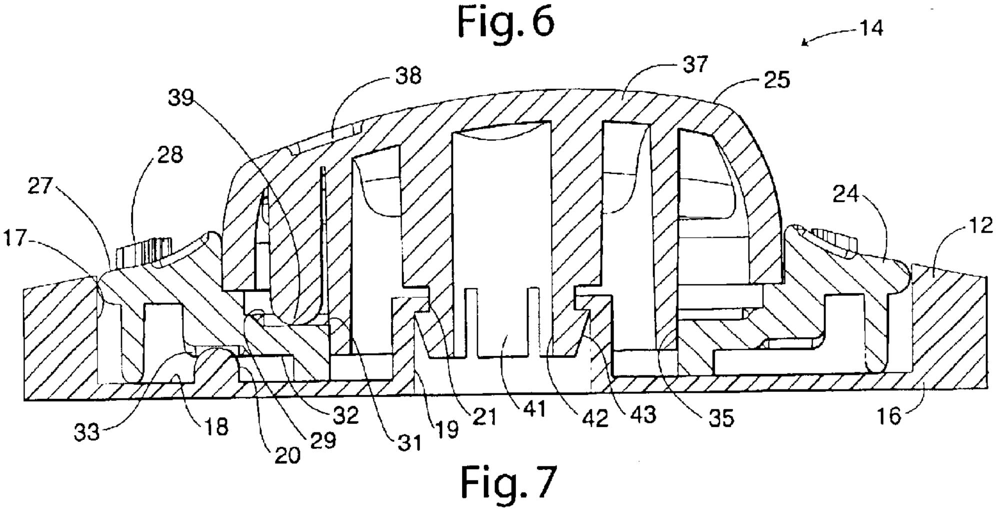
FIGS. 6–8 are a series of cross-sectional views of the schedule indicator of FIG. 1 showing different positions of the knob portion and the ring portion.

This initial positioning of the indicating ring 24 and indicating knob 25 is shown in cross-section in FIG. 6. The base projections 20 are releasably received within the indicating ring bottom depressions 33 to prevent accidental rotation of the indicating ring 24 relative to the base 16. The indicating knob protrusion 39 is releasably received within an indicating ring top depression 31 to prevent accidental rotation of the indicating knob 25 relative to the indicating ring 24.

Should the air purifier pre-filter be scheduled to be cleaned or replaced at two month intervals the indicating knob 25 is rotated so that its second selection arrow 38 is aligned with the month two months in the future, which in this example correlates to the letter M (MARCH) of the indicating ring timing indicia 28. However, in doing so one does not want to unregister a proper alignment of the indicating ring timing indicia 28 with the first selection arrow 13, which associates the proper replacement time of the air purifier's fine particulate filter. As such, it is desirous to rotate the indicating knob 25 without also causing rotation of the indicating ring 24.

Figure 4:
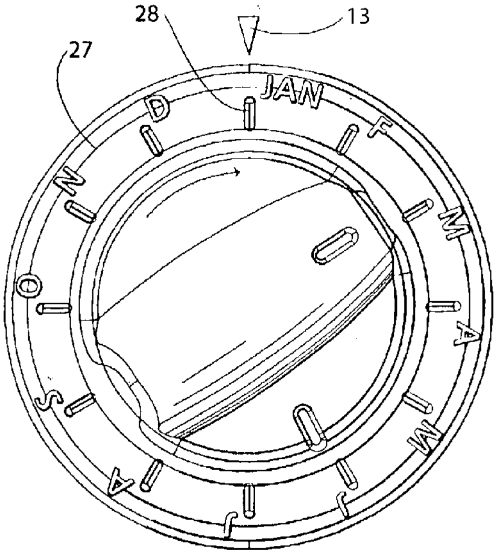
Figure 7:
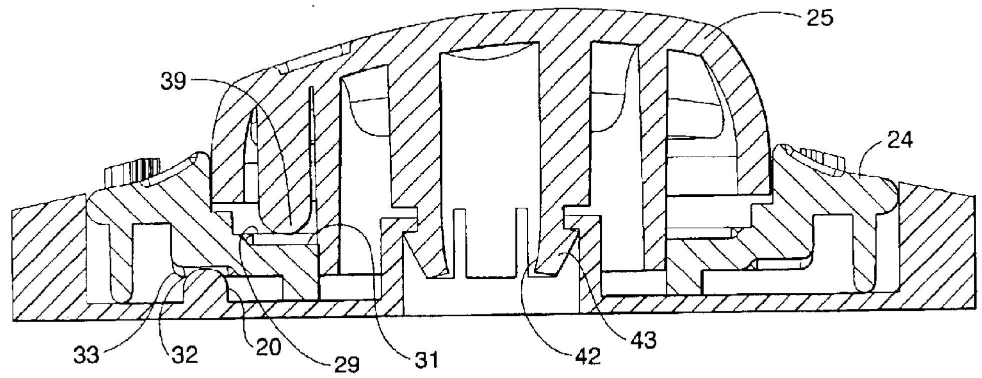

To accomplish this task the indicating knob grasping portion 37 is grasped by an operator and the indicating knob 25 is rotated to align the second selection arrow 38 with the desired month M (March) upon the indicating ring 24, as shown by the directional arrow in FIG. 4. As shown in FIG. 7, the rotation of the indicating knob 25 causes the indicating knob protrusion 39 to be displaced from underlying indicating ring top depression 31 and ride upon the indicating ring recessed top surface 27. This displacement of the protrusion 39 causes the entire indicating knob to rise thereby deflecting the mounting tabs 42 of the mounting post 41 and thereby create a downward biasing force upon the indicating knob 25. This displacement also causes the indicating knob 25 to be forced against the indicating ring 24, thereby insuring that the indicating knob base projections 20 are maintained within the indicating ring bottom depressions 33 to prevent rotation of the indicating ring 24. The indicating knob 25 is rotated in this manner until its second selection arrow 38 is aligned with the desired timing indicia 28, herein the indicia for the month M (March). As the selection arrow 38 reaches the desired month indicia, and in fact every month indicia, the indicating knob protrusion 39 is forced into a corresponding indicating ring top depression. With the protrusion nested within the top depression 31 the indicating knob 25 returns to its initial orientation with the mounting tabs 42 in their unflexed configuration. Thus, it should be understood that the indicating knob 25 may be rotated without causing similar or corresponding rotation of the indicating ring 24.

Figure 5:
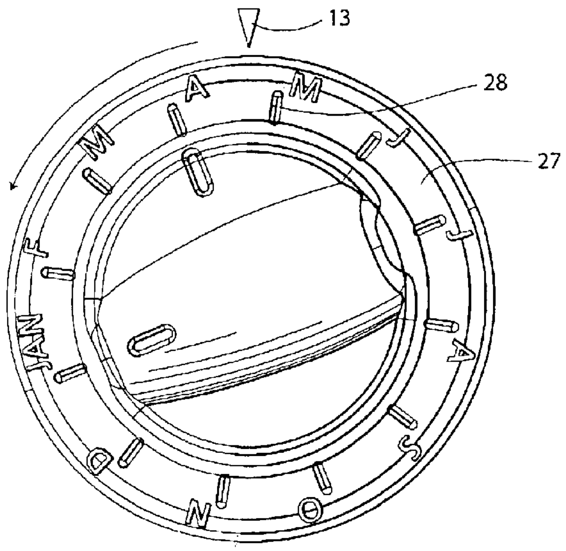

Should the air purifier fine particulate filter be scheduled to be cleaned or replaced at four month intervals the indicating ring 24 should be rotated four months into the future so that its timing indicia for the month of MAY (M second occurrence) is aligned with the base first selection arrow 13. However, in doing so the operator would want to maintain the registration of the indicating knob second selection arrow 38 with the selected month of the indicating ring timing indicia 28 so that the scheduled maintenance of the air purifier pre-filter is maintained during this rotational change. As such, it is desirous to rotate the indicating ring 24 to cause corresponding rotation of the indicating knob 25 with that of the indicating ring 24. Rotation of the indicating ring 24 is indicated by the directional arrow in FIG. 5.

Figure 8:
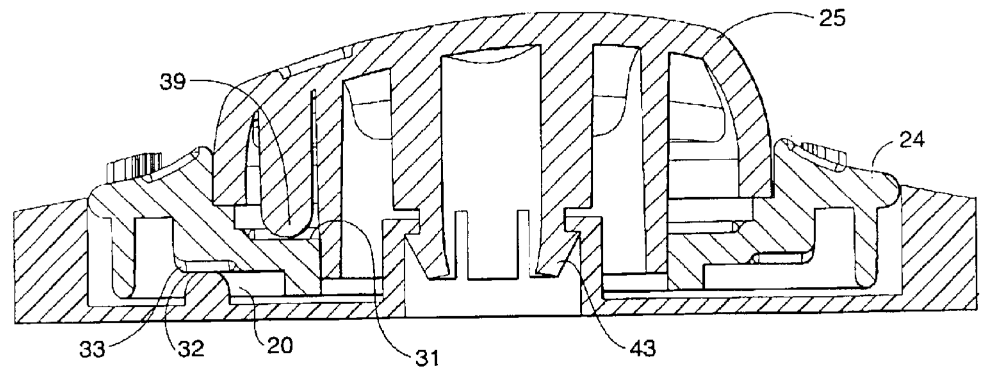

To accomplish this task the operator grasps or pushes upon the indicating ring 24 to forcibly rotate the indicating ring 24 so that the desired month M (May) is aligned with the base first selection arrow 13. As shown in FIG. 8, rotational movement of the indicating ring 24 causes the indicating ring bottom depressions 33 to be displaced from the underlying base projections 20, i.e., the base projections ride upon the indicating ring bottom surface 32 between adjacent bottom depressions 33. This displacement of the projections 20 causes the indicating ring 24 to rise, thereby also raising the position of the indicating knob 25 and causing the deflection of the indicating knob mounting tabs 42. The resulting biasing force upon the indicating knob created by the deflection of the mounting tabs 42 ensures that the indicating knob protrusion 39 is maintained within an indicating ring top depression 31 to prevent relative rotation between the indicating ring 24 and the indicating knob 25.

Once the desired month is aligned with the base first selection arrow 13 the indicating ring bottom depressions 33 are aligned with the underlying base projections 20, thereby allowing the base projections 20 to once again reside within the bottom depressions 33. The indicating ring 24 is forcibly lowered to this position by the biasing force created by the deflected mounting tabs 42. Thus, it should be understood that the indicating ring 24 may be rotated in conjunction with the indicating knob so that the registration of the indicating knob second selection arrow 38 is maintained with the desired month upon the indicating ring 24.

It should be understood that for ease of explanation when describing the rotational movement of the indicating knob 25 the indicating ring 24 was shown to indicate the month of January (Jan), and when describing the movement of the indicating ring 24 the indicating knob 25 was shown to indicate the month of January (Jan). However, it should be understood that the selection of the corresponding month with reference to one of the indicators has no bearing with respect to the corresponding month of the other indicator.

It should be understood that the indicating ring recessed top surface 29 may be termed a cam riding surface since the protrusion or cam 39 rides thereon. Similarly, the indicating ring bottom surface 32 may be termed a cam riding surface since the base projections 20 may be referenced to as an array of cams and these cams ride upon this surface. Also, the structure of the indicating knob protrusion 39 with the top depressions 31 as well as the structure of the base projections 20 with the indicating ring bottom depressions 33 may be considered detent mechanisms. Furthermore, the relative positioning of these components of the detent mechanisms may be reversed as an equivalent structure, i.e., the protrusion may extend from the indicating ring while the indicating knob has corresponding depressions, or the projections may extend from the bottom surface of the indicating ring with the base having a series of corresponding depressions.

It should also be understood that the flexing of the mounting tabs provide a biasing or spring force, however, other types of conventional springs, such as coil springs, may be utilized as an alternative.

Lastly, it should be understood that all references to directions of orientation, such as up, upwardly, down, downwardly, top and bottom are with reference to the drawings only and are not intended to be limitations. This should be recognized as the schedule indicator may be mounted to the side of some devices and thus its position is not limited to the top of the device and the directional terms associated with such a position.

It thus is seen that a schedule indicator which can maintain the maintenance schedule of two different items is now provided which overcomes problems with the prior art. While this invention has been described in detail with particular references to the preferred embodiments thereof, it should be understood that many modifications, additions and deletions, in addition to those expressly recited, may be made thereto without departure from the spirit and scope of the invention as set forth in the following claims.

What is claimed is:

1. A schedule indicator comprising, a base having at least one protrusion and a top surface with a first index indicia thereon;

a rotatable first condition indicating ring having a bottom surface with an annular array of first depressions sized and shaped to rotatably engage and disengage said base protrusion, and a top surface with an annular array of second depressions, said indicating ring also including an annular array of timing indicia upon said top surface, said timing indicia being alignable with said base index indicia to indicate the timing of a first timed event;

a rotatable second condition indicating member positioned concentrically within said first condition indicating ring, said second condition indicating member having at least one protrusion sized and shaped to rotatably engage and disengage said first condition indicating ring second depressions, said second condition indicating member having a second index indicia thereon alignable with said indicating ring annular array of timing indicia to indicate the timing of a second timed event; and means for coupling said indicating ring and said indicating member to said base to allow rotatably movement between said base and said first condition indicating ring and between said first condition indicating ring and said second condition indicating member, whereby manual rotation of the indicating member causes the indicating member protrusion to disengage from the indicating rind second depression and ride upon the top surface of the indicating ring between adjacent second depressions so as to cause a downward force upon the indicating ring which ensures that the base protrusion is maintained within the indicating ring first depression to prevent rotation of the indicating ring relative to the base, and whereby manual rotation of the indicating ring causes the base protrusion to be disengaged from the indicating ring first depression and ride upon the bottom surface of the indicating ring between adjacent first depressions causing the indicating ring to move away from the base thereby forcing the indicating member protrusion into engagement with the indicating ring second depression which ensures that the indicating member rotates in conjunction with the rotation of the indicating ring.

2. The schedule indicator of claim 1 wherein said coupling means comprises an opening within said base and a post extending from said indicating member having a catch sized and shaped to engage said base through said opening.

3. The schedule indicator of claim 1 further comprising biasing means for biasing said indicating member towards said base.

4. A schedule indicator comprising, a base having a first index indicia thereon;

a rotatable first condition indicating ring having an annular array of timing indicia thereon alignable with said base index indicia to indicate the timing of a first timed event;

a rotatable second condition indicating member positioned concentrically within said first condition indicating ring, said indicating member having a second index indicia thereon alignable with said annular array of timing indicia to indicate the timing of a second timed event;

means for coupling said indicating ring and said indicating member to said base to allow relative rotatable movement therebetween;

first detent means for engaging and disengaging said indicating ring with said base to prevent rotation of said indicating ring relative to the base while allowing for and during the rotation of the indicating member; second detent means for releasably engaging and disengaging the indicating member with the indicating ring to prevent relative rotation between the indicating member and the indicating ring while allowing for and during the rotation of the indicating ring relative to the base.

5. The schedule indicator of claim 4 wherein said detent mechanism comprises at least one protrusion extending from said base and at least one depression extending into said indicating ring.

6. The schedule indicator of claim 4 wherein said detent mechanism comprises at least one protrusion extending from said base and a radial array of depressions extending into said indicating ring.

7. The scheduling indicator of claim 4 wherein said first detent mechanism comprises at least one protrusion extending from said indicating member and at least one depression extending into said indicating ring.

8. The schedule indicator of claim 7 wherein said second detent mechanism comprises at least one second protrusion extending from said base and at least one second depression extending into said indicating ring.

9. The schedule indicator of claim 7 wherein said second detent mechanism comprises at least one second protrusion extending from said base and a radial array of second depressions extending into said indicating ring.

10. The schedule indicator of claim 4 further comprising biasing means for biasing said indicating member towards said base.

* * * * *